United States Patent
Koizumi et al.

(10) Patent No.: US 6,175,468 B1
(45) Date of Patent: *Jan. 16, 2001

(54) REPRODUCING APPARATUS WITH AUXILIARY SHUTTER CONFIGURATION

(75) Inventors: Osamu Koizumi; Takanobu Iwama, both of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/879,075

(22) Filed: Jun. 19, 1997

(30) Foreign Application Priority Data

Jun. 26, 1996 (JP) .................................................. 8-165497

(51) Int. Cl.$^7$ .................................................. G11B 15/675

(52) U.S. Cl. .................................................. 360/94

(58) Field of Search .................................. 360/94, 96.5, 85

(56) References Cited

U.S. PATENT DOCUMENTS

| | | | |
|---|---|---|---|
| 4,786,996 | * 11/1988 | Ohtani et al. | 360/94 |
| 5,046,169 | * 9/1991 | Tsujino | 360/94 |
| 5,237,470 | * 8/1993 | Sasaki et al. | 360/94 |
| 5,386,329 | * 1/1995 | Ikegawa | 360/94 |
| 5,408,459 | * 4/1995 | Kawaguchi et al. | 360/99.06 |
| 5,480,103 | 1/1996 | Gerfast et al. | 242/347 |
| 5,606,471 | * 2/1997 | Inoue et al. | 360/94 |
| 5,706,146 | * 1/1998 | Ono et al. | 360/94 |
| 5,757,579 | 5/1998 | Koizumi | 360/96.5 |

* cited by examiner

Primary Examiner—Brian E. Miller
(74) Attorney, Agent, or Firm—Limbach & Limbach L.L.P.; Seong-Kun Oh

(57) ABSTRACT

A reproducing apparatus includes a main shutter for closing a cartridge-holder opening, which is rotated in the cartridge-inserting direction when inserting one of the large and small cartridges so as to open the cartridge-holder opening. An auxiliary shutter is disposed in front of the main shutter with respect to the cartridge-inserting direction so as to restrain the position of the small cartridge with respect to the cartridge-holder opening.

17 Claims, 5 Drawing Sheets

REPRODUCING APPARATUS WITH AUXILIARY SHUTTER CONFIGURATION

BACKGROUND OF THE INVENTION

The present invention relates to a reproducing apparatus provided with a rotatable shutter for closing a cartridge-holder opening.

FIG. 8 shows a conventional reproducing apparatus provided with a rotatable shutter for closing a cartridge-holder opening, which can reproduce tapes of small and large cartridges. This reproducing apparatus 101 is provided with a rotatable shutter 104 for closing a cartridge-holder opening 103. The rotatable shutter 104 is constructed such that, when inserting a small cartridge 201 or a large cartridge 202 into the cartridge-holder opening 103, it is pressed by the cartridge and is rotated in the inserting direction thereof to open the cartridge-holder opening 103, and when removing the small or large cartridge 201, 202 through the cartridge-holder opening 103, it is automatically rotated in the opposite direction to close the cartridge-holder opening 103.

With the conventional reproducing apparatus 101, however, since the size of the cartridge-holder opening 103 is determined in accordance with that of the large cartridge 202, it is too large for the small cartridge 201, often causing a positional displacement when inserting the small cartridge 201. The fact that the cartridge-holder opening 103 is closed by the rotatable shutter 104 makes more difficult an insertion of the small cartridge 201 in the normal position.

If the small cartridge 201 positionally displaced is loaded into a cartridge holder, component parts such as a magnetic head disposed therein may be damaged, resulting in impossible accurate reproduction.

It is, therefore, an object of the present invention to provide a reproduction apparatus which allows an insertion of the small cartridge in the normal position.

SUMMARY OF THE INVENTION

According to one aspect of the present invention, there is provided a reproducing apparatus with an opening for receiving first and second cartridges, the first cartridge being larger in width than the second cartridge, comprising:

a first shutter arranged to close the opening, said first shutter being rotated in a cartridge-inserting direction when inserting one of the first and second cartridges so as to open the opening; and a second shutter disposed in front of said first shutter with respect to said cartridge-inserting direction, said second shutter restraining a position of the second cartridge with respect to the opening.

Another aspect of the present invention lie in providing a reproducing apparatus with an opening for receiving first and second cartridges, the first cartridge being larger in width than the second cartridge, comprising:

means for closing the opening, said closing means being rotated in a cartridge-inserting direction when inserting one of the first and second cartridges so as to open the opening; and means, disposed in front of said closing means with respect to said cartridge-inserting direction, for restraining a position of the second cartridge with respect to the opening.

DETAILED DESCRIPTION OF THE INVENTION

Figure 1:
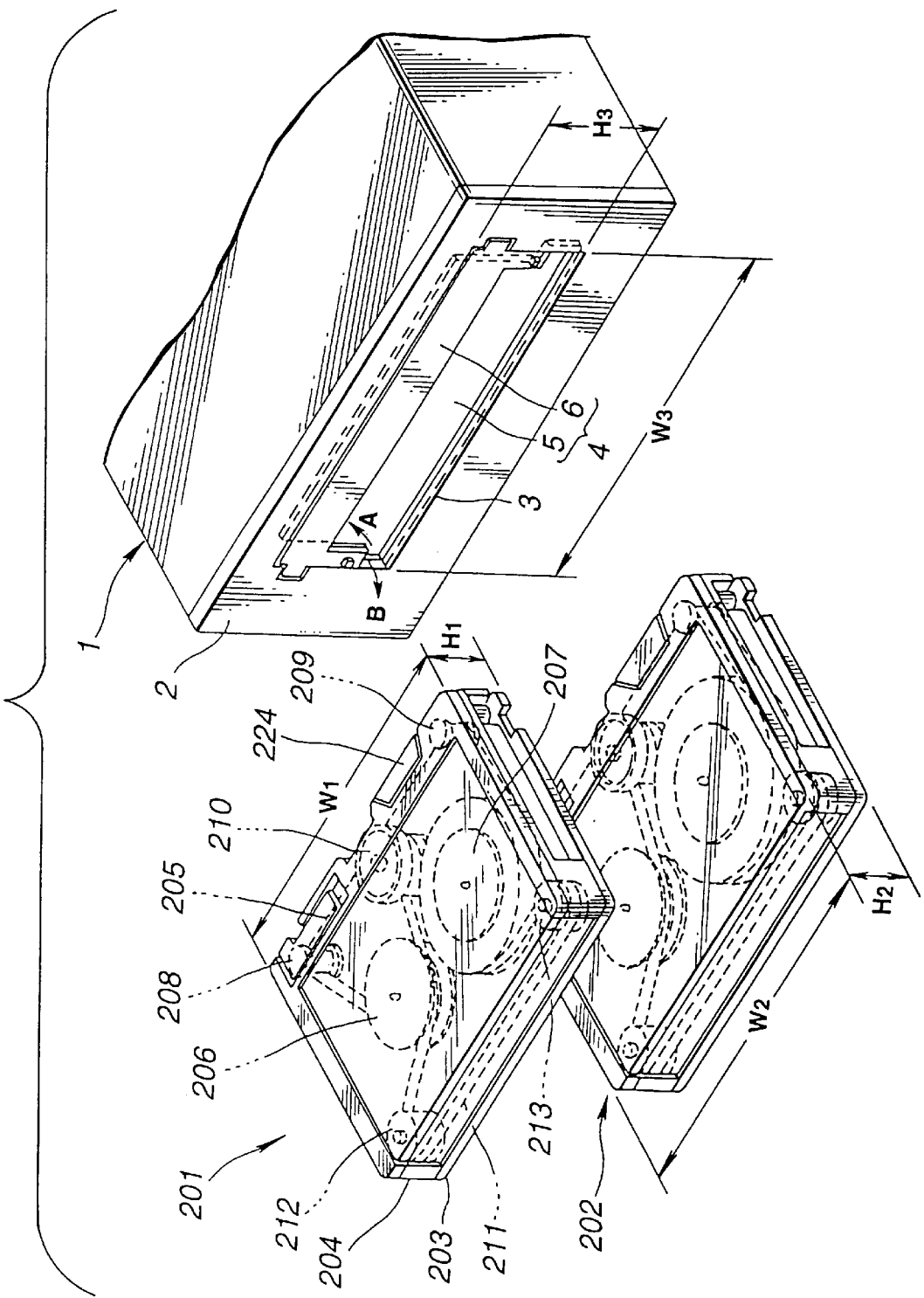
FIG. 1 is a perspective view showing a reproducing apparatus and small and large cartridges.

Referring to the drawings, particularly to FIG. 1, a reproducing apparatus 1 is constructed to be capable of receiving a small or normal-size cartridge 201 and a large cartridge 202 through a cartridge-holder opening 3 of a front panel 2, and is provided with a rotatable shutter 4 for closing the cartridge-holder opening 3.

The rotatable shutter 4 comprises a main shutter portion 5 and an auxiliary shutter portion 6. The main shutter portion 5 is constructed such that, when inserting the small or large cartridge 201, 202 into the cartridge-holder opening 3, it is pressed by the cartridge and is rotated in the inserting direction thereof to open the cartridge-holder opening 3, and when removing the small or large cartridge 201, 202 through the cartridge-holder opening 3, it is automatically rotated in the opposite direction to close the cartridge-holder opening 3. On the other hand, the auxiliary shutter portion 6 serves to restrain the inserting position of the small cartridge 201 when inserted into the cartridge-holder opening 3.

The auxiliary shutter portion 6 cannot be rotated inwardly of the cartridge-holder opening 3, i.e. in the direction of arrow A in FIG. 1, but can be rotated only outwardly thereof, i.e. in the direction of arrow B in FIG. 1.

Figure 2:
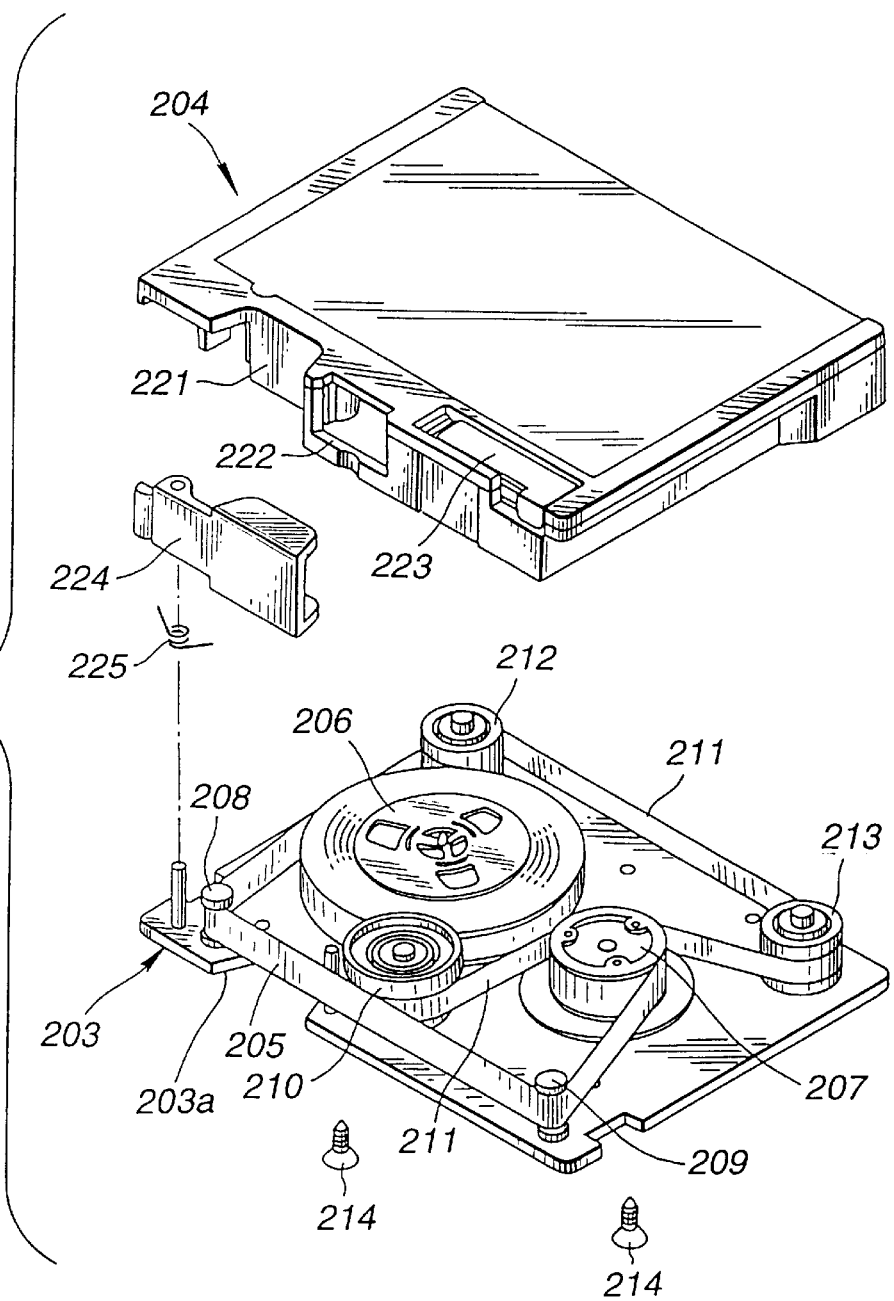
FIG. 2 is an exploded perspective view showing the small cartridge.

The structure of this embodiment will be described. First, the small and large cartridges 201, 202 will be described. The cartridges 201, 202 include a belt-driven tape cartridge (refer generally to as "data cartridge") which serves as, e.g. an external recording medium of a computer. Each cartridge 201, 202 comprises a base plate 203 of aluminum, and a cover 204 of synthetic resin mounted thereon. Referring to FIG. 2, the base plate 203 comprises a first reel 206 and a second reel 207 for winding thereon a magnetic tape 205, a first tape guide 208 for guiding winding of the magnetic tape 205 on the first reel 206, a second tape guide 209 for guiding winding of the magnetic tape 205 on the first reel 206, a drive roller 210 disposed between the first and second tape guides 208, 209, a looped drive belt 211 driven by the drive roller 210, a first corner roller 212 for pressing the drive belt 211 on the periphery of the first reel 206, and a second corner 213 for pressing the drive belt 211 on the periphery of the second reel 207.

The cover 204 is mounted on the base plate 203 by screws 214 to cover the first and second reels 206, 207, the first and second tape guides 208, 209, the drive roller 210, and the first and second corner rollers 212, 213.

Arranged in the front side of the cover 204 is a head opening 221 located to correspond to a head inserting recess 203a of the base plate 203. Arranged in the center of the cover 204 is a window 222 for exposing part of the drive roller 210. Moreover, slidably mounted to the upper side of the cover 204 is a member 223 for preventing error erasing.

A cover 224 is rotatably mounted to the head opening 221, and is biased in the direction to close the head opening 221 by a torsion coil spring 225.

Referring to FIG. 1, the small cartridge 201 is 81.0 mm in width $W_1$, and 14.5 mm in height $H_1$. The large cartridge 202 is of substantially the same structure as the small cartridge 201, and is larger than that to obtain increased recording capacity, i.e. 93.0 mm in width $W_2$, and 14.5 mm in height $H_2$.

The reproducing apparatus 1 will be described. Referring to FIG. 1, the reproducing apparatus 1 is constructed such that the cartridge-holder opening 3 is of the width $W_3$ which is determined in accordance with the width $W_2$ of the large cartridge 202, and is thus equal to or slightly larger than that. The cartridge-holder opening 3 is of the height $H_3$ which is greater than the heights $H_1$, $H_2$ of the small and large cartridges 201, 202, and is determined, e.g. to 18–20 mm.

Figure 3:
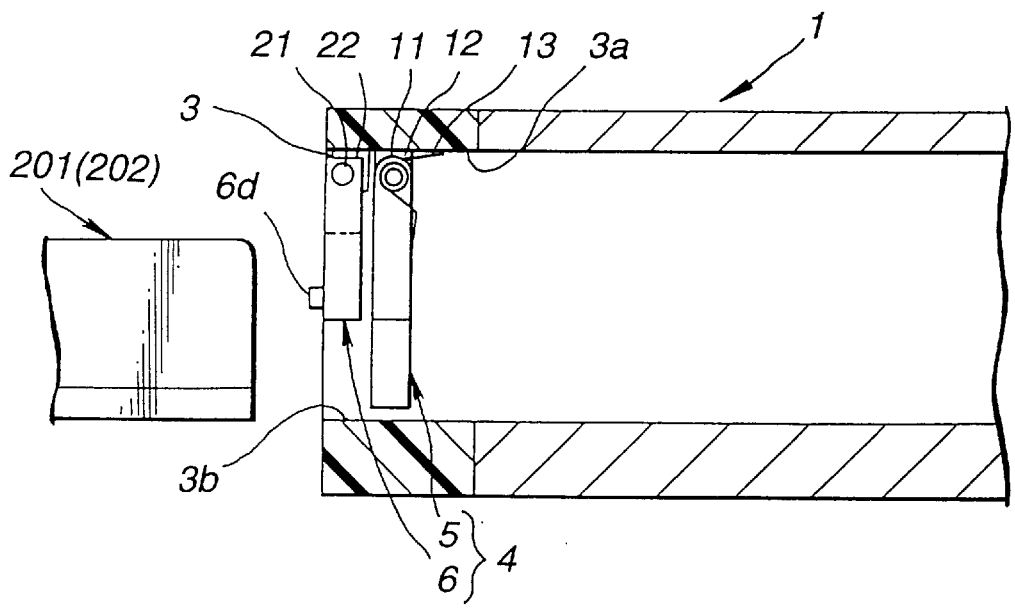
FIG. 3 is a fragmentary section showing the reproducing apparatus.

Referring to FIG. 3, the main and auxiliary shutter portions 5, 6 of the rotatable shutter 4 are arranged before and behind with respect to the cartridge inserting direction. That is, the auxiliary shutter portion 6 is disposed before with respect to the cartridge inserting direction, and the main shutter portion 5 is disposed behind with respect to the cartridge inserting direction.

The main shutter portion 5 has an upper end supported on the upper side 3a of the cartridge-holder opening 3 by a support shaft 11 and a bearing 12 so as to be rotatable in the cartridge inserting direction. The main shutter portion 5 is pressed on a stopper, not shown, by receiving clockwise torque as viewed in FIG. 3 from a torsion coil spring 13 mounted to the support shaft 11, closing the cartridge-holder opening 3. The main shutter portion 5 can be rotated inwardly of the cartridge-holder opening 3, i.e. counterclockwise as viewed in FIG. 3, and cannot be rotated outwardly thereof, i.e. clockwise as viewed in FIG. 3.

Likewise, the auxiliary shutter portion 6 for restraining the inserting position of the small cartridge 201 has an upper end supported on the upper side 3a of the cartridge-holder opening 3 by a support shaft 21 and a bearing 22 so as to be rotatable in the cartridge removing direction.

Figure 4:
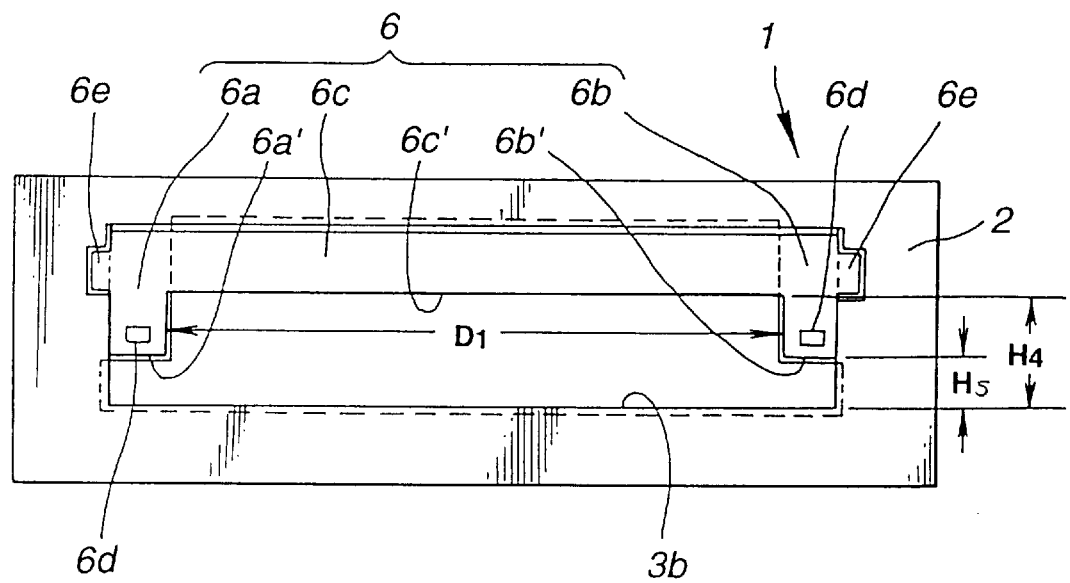
FIG. 4 is a front view showing the reproducing apparatus.

Referring to FIG. 4, the auxiliary shutter portion 6 is shaped substantially like a C by a pair of side members 6a, 6b arranged parallel to each other with a distance $D_1$ which is substantially equal to the width $W_2$ of the large cartridge 202, and a connecting member 6c for connecting the upper ends of the side members 6a, 6b. Knobs 6d are arranged at the lower ends of the front side of the side members 6a, 6b to rotate the auxiliary shutter portion 6.

The auxiliary shutter portion 6 is mounted to the cartridge-holder opening 3 such that the height $H_4$ from a lower edge 6c' of the connecting member 6c to a lower side 3b of the cartridge-holder opening 3 is substantially equal to the heights $H_1$, $H_2$ of the small and large cartridges 201, 202, and the height $H_5$ from lower ends 6a', 6b' of the side members 6a, 6b to the lower side 3b of the cartridge-holder opening 3 is smaller than the height $H_1$ of the small cartridge 201 at least by 1 mm or more ($H_4$–$H_5$>1 mm) so as to be capable of restraining the inserting position of the small cartridge 201. In this embodiment, the height $H_5$ is determined to be equal approximately to ½ the height $H_1$.

Figure 5:
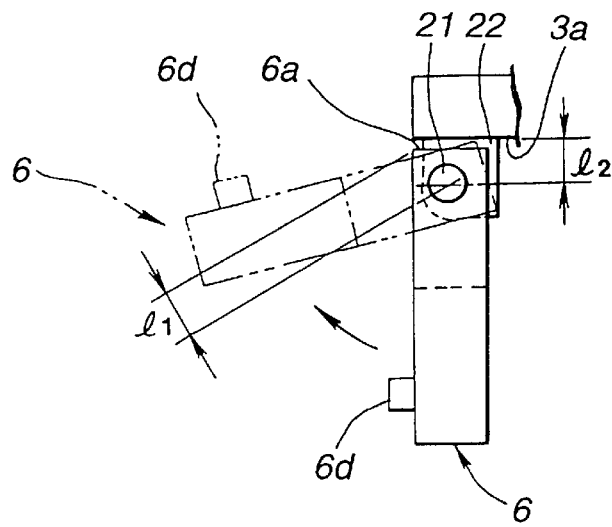
FIG. 5 is a side view showing an auxiliary shutter.

The auxiliary shutter portion 6 cannot be rotated further inwardly of the cartridge-holder opening 3, and can be rotated only outwardly thereof when stopper members 6e arranged on both sides thereof contact the front face of the front panel 2. Referring to FIG. 5, when rotated outwardly of the cartridge-holder opening 3, i.e. clockwise, by a predetermined angle as indicated by two-dot chain line in FIG. 5 so as to open the cartridge-holder opening 3, the auxiliary shutter portion 6 is locked by a lock mechanism to keep the cartridge-holder opening 3 open. The lock mechanism is obtained by, e.g. determining a distance $l_1$ from the support shaft 21 to an upper edge 6f of the auxiliary shutter portion 6 to a value slightly greater than a distance $l_2$ from the support shaft 21 to the upper side 3a of the cartridge-holder opening 3. A cartridge holder, not shown, is arranged behind the cartridge-holder opening 3, and comprises a drive capstan roller and a magnetic head. When loading the small or large cartridge 201, 202 in the normal position, the drive capstan roller contacts the drive roller 210 of the cartridge, and the magnetic head contacts the magnetic tape 205.

Figure 6:
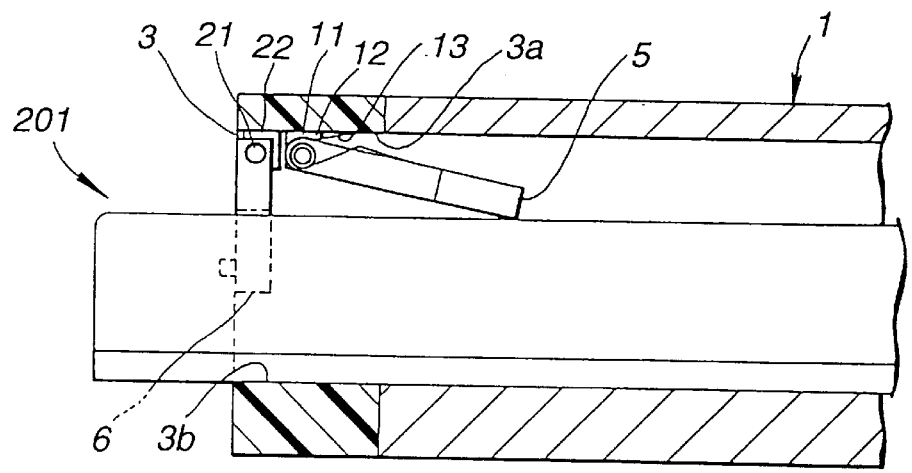
FIG. 6 is a view similar to FIG. 3, showing the reproducing apparatus with the small cartridge inserted.
Figure 7:
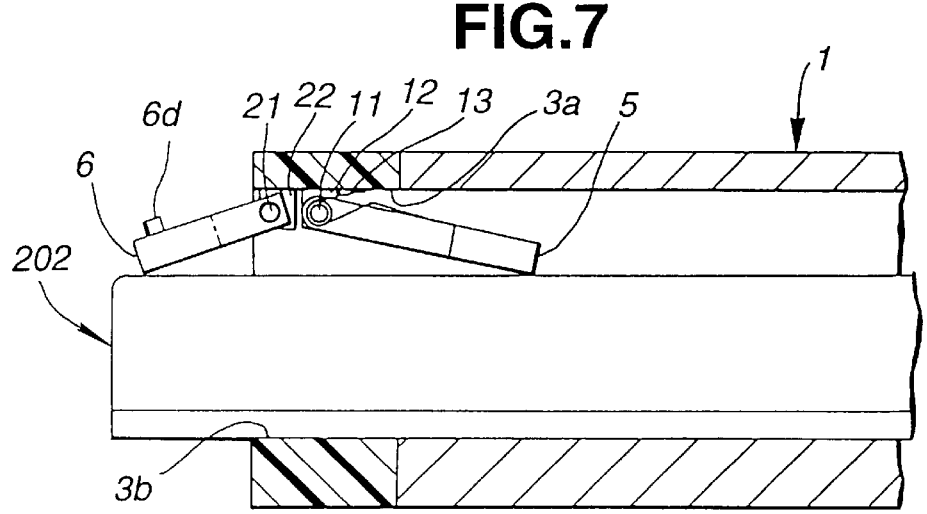
FIG. 7 a view similar to FIG. 6, showing the reproducing apparatus with the large cartridge inserted.
Figure 8:
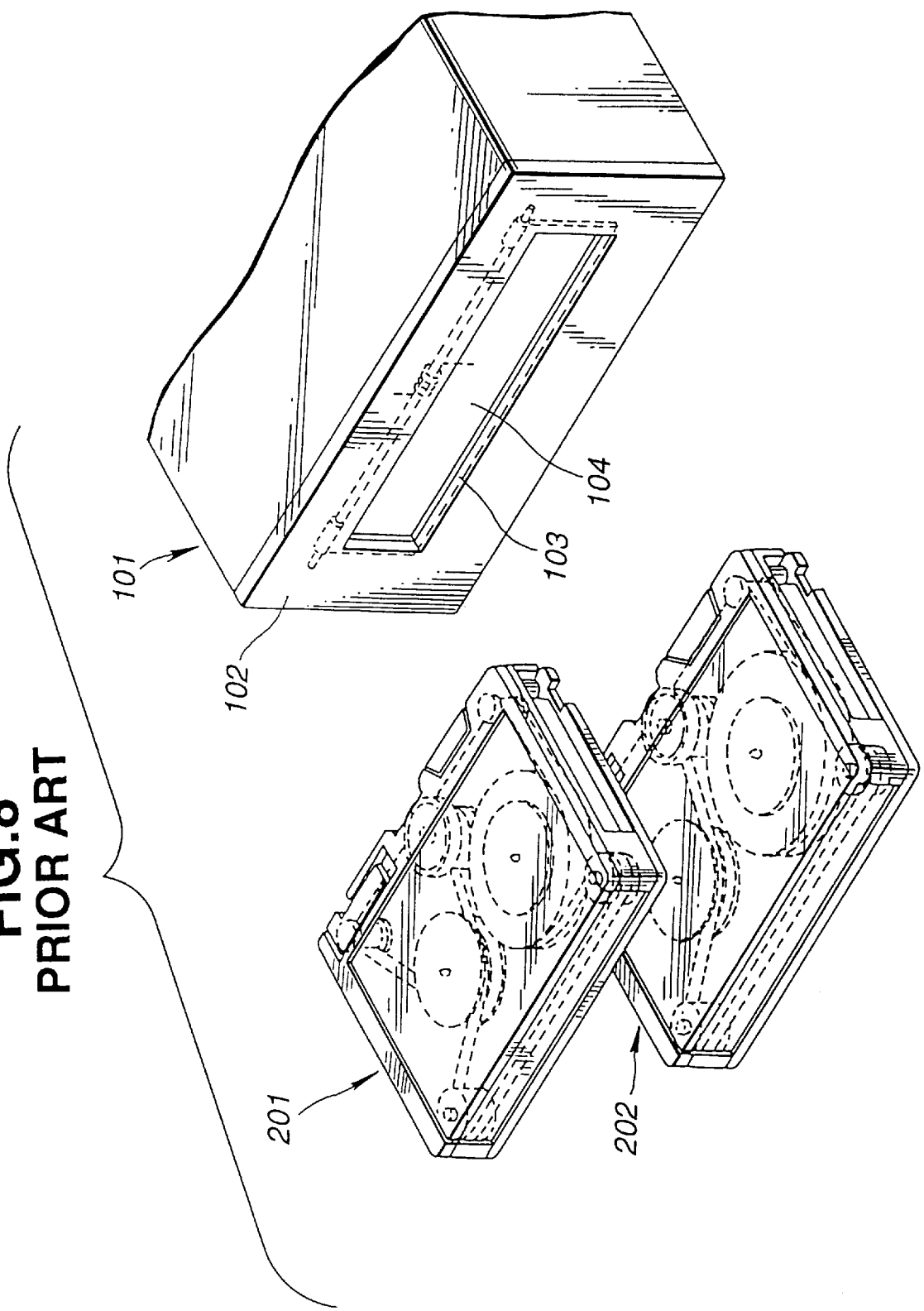
FIG. 8 is a view similar to FIG. 2, showing an conventional reproducing apparatus.

Next, the operation of this embodiment will be described. When inserting the small cartridge 201 into the cartridge-holder opening 3, referring to FIG. 6, the side members 6a, 6b of the auxiliary shutter portion 6 serve to position the small cartridge 201 in the center of the cartridge-holder opening 3. On the other hand, when inserting the large cartridge 202 into the cartridge-holder opening 3, referring to FIG. 7, the auxiliary shutter portion 6 is rotated outwardly of the cartridge-holder opening 3, i.e. clockwise as viewed in FIG. 7 so that the auxiliary shutter portion 6 does not form an obstacle to insertion of the large cartridge 202.

Having described the present invention in connection with the preferred embodiment, it is noted that the present invention is not limited thereto, and various changes and modifications can be made without departing from the scope of the present invention. By way of example, in the embodiment, the height $H_5$ of the side members 6a, 6b of the auxiliary shutter portion 6 is determined to be equal approximately to ½ the height $H_1$ of the small cartridge 201. Alternately, the height $H_5$ may be greater or smaller than the value given in the embodiment on condition that the inserting position of the small cartridge 201 can be restrained.

Moreover, in the embodiment, the reproducing apparatus is adapted for the belt-driven tape cartridge. Alternately, the reproducing apparatus may be adapted for the other cartridges such as a disk cartridge.

What is claimed is:

1. A reproducing apparatus with an opening for receiving first and second cartridges, the first cartridge being larger in width than the second cartridge, comprising:

a first shutter arranged to close the opening when at a closed position, said first shutter having a rotatable side about which said first shutter is configured to open by pivoting in a cartridge-inserting direction during the insertion of either of said first and second cartridges in said opening, said rotatable side of said first shutter located at an upper portion of said first shutter; and a second shutter disposed in front of said first shutter with respect to said cartridge-inserting direction, said second shutter having a rotatable side about which said second shutter is configured to pivot, said second shutter configured to restrain the insertion of the second cartridge in the opening prior to the insertion therein, said second shutter configured to open by pivoting about said rotatable side in a substantially opposite direction to the cartridge-insertion direction before the insertion of said first cartridge into said opening, said second shutter further configured to remain stationary at said closed position during the insertion of said second cartridge.

2. The apparatus of claim 1, further comprising:
means for biasing the first shutter in a direction to close the opening.

3. The apparatus of claim 2, wherein said biasing means include a torsion coil spring.

4. The apparatus of claim 1, wherein said second shutter includes operation members for obtaining rotation thereof.

5. A reproducing apparatus as claimed in claim 4, wherein said second shutter is configured to partially close the opening with an uncovered portion which is substantially as large as a cross section of the second cartridge.

6. A reproducing apparatus with an opening for receiving first and second cartridges, the fist cartridge being larger in width than the second cartridge, comprising:

means for closing the opening when at a closed position, said closing means configured to pivot in a cartridge-inserting direction during the insertion of either one of the first and second cartridges in said opening so as to open the opening; and means, disposed in front of said closing means with respect to said cartridge-inserting direction, for restraining a position of the second cartridge with respect to the opening, said restraining means configured to open by pivoting in a substantially opposite direction to the cartridge-insertion direction before the insertion of said first cartridge therein, said restraining means further configured to restrain the insertion of said second cartridge in said opening by remaining at said closed position.

7. The apparatus of claim 6 further comprising means for biasing said means for closing said opening in a direction to close the opening.

8. The apparatus of claim 7 wherein said biasing means includes a torsion coil spring.

9. The apparatus of claim 6 wherein said restraining means includes operation members for obtaining rotation thereof.

10. The apparatus of claim 9 wherein said restraining means is configured to partially close the opening with an uncovered portion which is substantially as large as a cross section of the second cartridge.

11. A reproducing apparatus with an opening for receiving first and second cartridges, the first cartridge being larger in width than the second cartridge, comprising:

a first shutter arranged to close the opening when at a closed position, said first shutter having a rotatable side about which said first shutter is configured open by pivoting in a cartridge-inserting direction during the insertion of either one of the first and second cartridges in said opening, said rotatable side of said first shutter located at an upper portion of said first shutter;

a second shutter disposed in front of said first shutter with respect to said cartridge-inserting direction, said second shutter having a rotatable side about which said second shutter is configured to pivot, said second shutter configured to restrain the insertion of the second cartridge in the opening prior to the insertion therein, said second shutter configured to open by pivoting about said rotatable side in a substantially opposite direction to said cartridge-insertion direction before the insertion of said first cartridge into said opening, said second shutter further configured to remain stationary at said closed position during the insertion of said second cartridge; and a plurality of knobs, each respectively arranged at the lower ends of the front side of said side members of said second shutter, said plurality of knobs being configured to assist rotation of said second shutter about said rotatable side.

12. The apparatus of claim 11 wherein a counter-clockwise rotational force is acted upon said knobs of said second shutter.

13. The apparatus of claim 11 further comprising means for biasing the first shutter in a direction to close the opening.

14. The apparatus of claim 13 wherein said biasing means include a torsion coil spring.

15. The apparatus of claim 11 wherein said second shutter includes operation members for obtaining rotation thereof.

16. The apparatus of claim 15 wherein said second shutter is configured to partially close the opening with an uncovered portion which is substantially as large as a cross section of the second cartridge.

17. The apparatus of claim 13 wherein said biasing means is configured to provide a counter-clockwise rotational force upon said knobs of said second shutter.

* * * * *